United States Patent
Ovsiannikov et al.

(10) Patent No.: US 9,277,136 B2
(45) Date of Patent: Mar. 1, 2016

(54) IMAGING SYSTEMS AND METHODS WITH PIXEL SENSITIVITY ADJUSTMENTS BY ADJUSTING DEMODULATION SIGNAL

(71) Applicant: Samsung Electronics Co., Ltd., Suwon-si, Gyeonggi-do (KR)

(72) Inventors: Ilia Ovsiannikov, Studio City, CA (US); Gregory M. Waligorski, Redondo Beach, CA (US); Deokha Shin, Gunpo-si (KR); Wang-Hyun Kim, Namyangju-si (KR); Yibing M. Wang, Temple City, CA (US); Hongyu Wang, San Gabriel, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 105 days.

(21) Appl. No.: 14/210,369

(22) Filed: Mar. 13, 2014

(65) Prior Publication Data
US 2015/0146089 A1    May 28, 2015

Related U.S. Application Data

(60) Provisional application No. 61/908,721, filed on Nov. 25, 2013.

(51) Int. Cl.
*H04N 5/235* (2006.01)
(52) U.S. Cl.
CPC .................... *H04N 5/2353* (2013.01)
(58) Field of Classification Search
CPC . H04N 19/89; H04N 21/4382; H04N 5/2353; H04N 5/40; H04N 5/455
USPC ........ 250/208.1, 214 R, 214.1; 348/291–311; 257/290–292, 440–444
See application file for complete search history.

(56) References Cited

U.S. PATENT DOCUMENTS

| | | | |
|---|---|---|---|
| 7,098,952 B2 | 8/2006 | Morris et al. | |
| 7,236,199 B2 | 6/2007 | Hori et al. | |
| 7,349,033 B2 * | 3/2008 | Chang ...................... | H04N 9/66 348/620 |
| 7,462,808 B2 | 12/2008 | Lustenberger et al. | |
| 7,617,267 B1 | 11/2009 | Young | |
| 7,859,581 B2 | 12/2010 | Guidash | |
| 2011/0129123 A1 | 6/2011 | Ovsiannikov et al. | |
| 2011/0164132 A1 | 7/2011 | Buettgen et al. | |
| 2012/0012899 A1 | 1/2012 | Jin et al. | |
| 2012/0062705 A1 | 3/2012 | Ovsiannikov et al. | |
| 2012/0134598 A1 | 5/2012 | Ovsiannikov et al. | |
| 2013/0140433 A1 | 6/2013 | Oggier et al. | |

FOREIGN PATENT DOCUMENTS

GB    2487943 A    8/2012

* cited by examiner

*Primary Examiner* — Que T Le
(74) *Attorney, Agent, or Firm* — Renaissance IP Law Group LLP

(57) ABSTRACT

Imaging systems, such as time-of-flight imaging systems, and methods with pixel sensitivity adjustments. An embodiment includes a method, comprising: for a plurality of pixels having a first output and a second output, measuring the first outputs and the second outputs in response to a demodulation signal; and adjusting the demodulation signal such that a combination of the first outputs is substantially similar to a combination of the second outputs.

18 Claims, 11 Drawing Sheets

IMAGING SYSTEMS AND METHODS WITH PIXEL SENSITIVITY ADJUSTMENTS BY ADJUSTING DEMODULATION SIGNAL

BACKGROUND

This disclosure relates to imaging systems and methods and in particular, imaging systems with pixel sensitivity adjustments.

In time-of-flight 3D applications, sensors detect modulated light responses for depth calculations. However, pixel tap sensitivity may be unequal due to various semiconductor manufacturing and circuit design reasons and limitations. The unequal sensitivities may cause erroneous results or prevent particular pixel structures from being used.

SUMMARY

An embodiment includes a method, comprising: for a plurality of pixels having a first output and a second output, measuring the first outputs and the second outputs in response to a demodulation signal; and adjusting the demodulation signal such that a combination of the first outputs is substantially similar to a combination of the second outputs.

An embodiment includes a system, comprising: a demodulation signal generator configured to generate a demodulation signal; a pixel array coupled to the demodulation signal generator and including a plurality of pixels, each pixel configured to generate a first output and a second output in response to the demodulation signal; and a controller configured to: measure the first outputs and the second outputs; and adjust the demodulation signal such that a combination of the first outputs is substantially similar to a combination of the second outputs.

An embodiment includes a method, comprising: for a plurality of pixels, measuring an outputs of the pixels in response to a demodulation signal; and adjusting the demodulation signal to generate an adjusted demodulation signal such that a deviation from a threshold of the outputs when measured with the adjusted demodulation signal is reduced from a deviation from the threshold of the outputs when measured with the demodulation signal.

DETAILED DESCRIPTION

Figure 1:
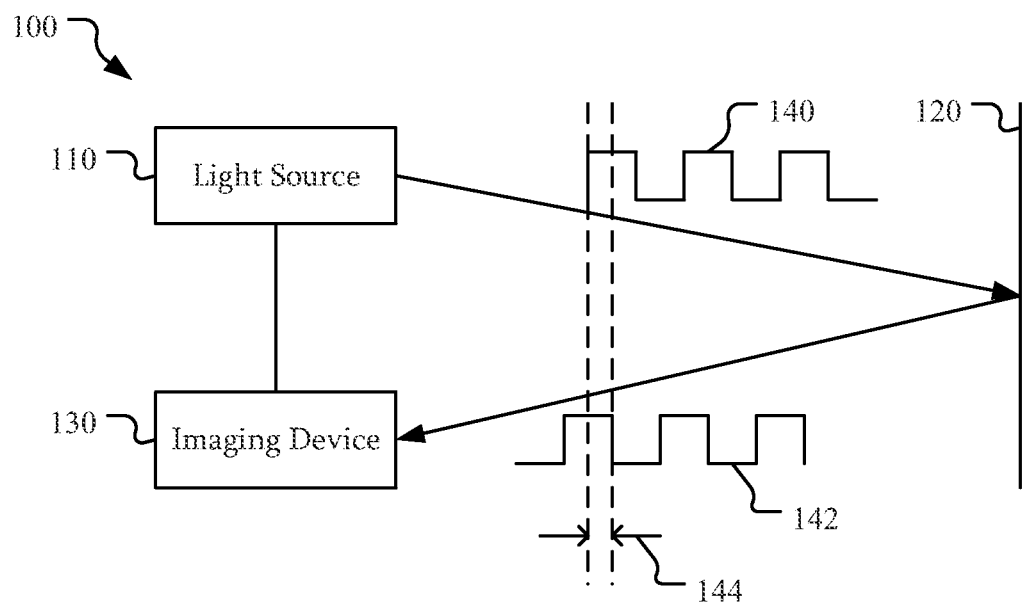
FIG. 1 is a schematic view of an imaging system according to an embodiment.

The embodiments relate to imaging systems and methods with pixel sensitivity adjustments. The following description is presented to enable one of ordinary skill in the art to make and use the embodiments and is provided in the context of a patent application and its requirements. Various modifications to the exemplary embodiments and the generic principles and features described herein will be readily apparent. The exemplary embodiments are mainly described in terms of particular methods and systems provided in particular implementations.

However, the methods and systems will operate effectively in other implementations. Phrases such as "exemplary embodiment", "one embodiment" and "another embodiment" may refer to the same or different embodiments as well as to multiple embodiments. The embodiments will be described with respect to systems and/or devices having certain components. However, the systems and/or devices may include more or less components than those shown, and variations in the arrangement and type of the components may be made. The exemplary embodiments will also be described in the context of particular methods having certain steps. However, the method and system operate effectively for other methods having different and/or additional steps and steps in different orders that are not inconsistent with the exemplary embodiments. Thus, embodiments are not intended to be limited to the particular embodiments shown, but are to be accorded the widest scope consistent with the principles and features described herein.

The exemplary embodiments are described in the context of particular system having certain components. One of ordinary skill in the art will readily recognize that embodiments may have other and/or additional components and/or other features not inconsistent with the embodiments described herein. However, one of ordinary skill in the art will readily recognize that the method and system are consistent with other structures. In addition, one of ordinary skill in the art will readily recognize that embodiments could have another structure. The method and system are also described in the context of single elements. However, one of ordinary skill in the art will readily recognize that the method and system are consistent with the use of imaging systems having multiple elements.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. Furthermore, in those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Embodiments relate to time-of-flight (TOF) imaging systems, color-and-depth (RGBZ) imaging systems, or the like. In an embodiment, in a time-of-flight 3D application, sensors may be used to detect modulated light. In response, the detected modulated light may be used for a depth calculation. Pixels may be used to detect the modulated light. Each pixel may have one or more taps. Pixel tap sensitivity may be initially unequal due to various semiconductor manufacturing and circuit design reasons and limitations. As described in further detail below, demodulation signals may be adjusted such that at least some of the pixel tap sensitivities become substantially equalized. As will be described in further detail below, benefits associated with the use of two-tap pixels may be further realized and/or improved.

FIG. 1 is a schematic view of an imaging system according to an embodiment. In an embodiment, the system 100 may be a time-of-flight (TOF) imaging system. The system 100 includes a light source 110 and an imaging device 130.

The light source 110 is configured to emit a periodic waveform 140 that travels to an object 120, reflects from the object 120 and travels back to the imaging device 130 as a reflected periodic waveform 142. The imaging device 130 is configured to demodulate the reflected periodic waveform 142. A phase of the demodulated waveform is compared against a phase of the modulation used to generate the periodic waveform 140. A phase difference Δϕ corresponding to the phase difference 144 between the periodic waveforms 140 and 142 may be calculated. From the phase difference Δϕ, a distance between the system 100 and the object 120 may be calculated.

A phase ϕ may be calculated by taking 4 samples of image intensity per modulation period, for example, at 0°, 90°, 180° and 270° phase shift. These samples are designated as $A_0, A_1, A_2, A_3$. The following data may be calculated using equations 1-4.

$$\varphi = \arctan\left(\frac{A_3 - A_1}{A_2 - A_0}\right) \quad (1)$$

$$G = \frac{A_3 + A_2 + A_1 + A_0}{4} \quad (2)$$

$$I = \frac{\sqrt{(A_3 - A_1)^2 + (A_2 - A_0)^2}}{2} \quad (3)$$

$$d = \frac{\varphi}{2\pi} \cdot \frac{c}{2 f_{MOD}} \quad (4)$$

Here, G is the average of the received signal and may be referred to as a background signal, I is the amplitude of the returning periodic waveform 142 and may be referred to as an intensity of the demodulated signal, d is the measured distance, $f_{MOD}$ is the modulation/demodulation frequency and c is the speed of light in the medium, such as the speed of light in air.

Pixels of the imaging device 130 may be configured to output one sample, $A_i$, per image. These pixels are referred to as one-tap or single-tap pixels. Pixels of the imaging device 130 may also include two-tap pixels. A two-tap pixel may be configured to substantially simultaneously output two signals having the opposite, 180°, demodulation phase, e.g. $A_0$ and $A_2$ or $A_1$ and $A_3$.

Another architecture that may be used in the imaging device 130 includes a pseudo one-tap pixel. A pseudo one-tap pixel architecture includes using two-tap pixels while performing differential sampling. In pseudo one-tap pixel architecture, the pixels are two-tap pixels configured to output two samples per image: $A_0$ and $B_0$, $A_1$ and $B_1$, $A_2$ and $B_2$, $A_3$ and $B_3$. Here, each $B_i$ output demodulates the returning light with 180° phase shift with respect to $A_i$. The depth may be calculated using equations 5-7 and 4, described above.

$$\varphi = \arctan\left(\frac{(A_3 - B_3)(A_1 - B_1)}{(A_2 - B_2)(A_0 - B_0)}\right) \quad (5)$$

$$G = \frac{A_3 + A_2 + A_1 + A_0 + B_3 + B_2 + B_1 + B_0}{4} \quad (6)$$

$$I = \frac{\sqrt{((A_3 - B_3) - (A_1 - B_1))^2 + ((A_2 - B_2) - (A_0 - B_0))^2}}{2} \quad (7)$$

Although some pixel types and architectures have been used as examples, different pixel types and architectures may be used. For example, pixels with more than two taps may be used in the imaging device 130. Furthermore, although pixels have been described as being used in a distance calculation, the pixels need not all be configured for such measurements. For example, in an RBGZ imaging system, some pixels may be configured to sense colors while other pixels are configured to sense distance.

Figure 2:
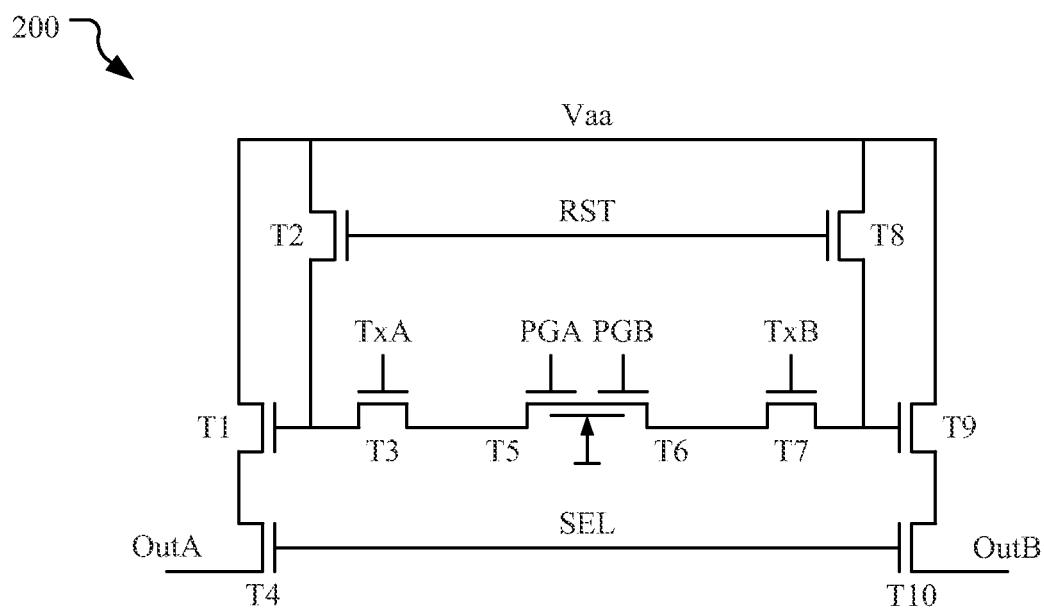
FIG. 2 is a schematic view of a two-tap pixel according to an embodiment.

FIG. 2 is a schematic view of a two-tap pixel according to an embodiment. The pixel 200 may be configured to sense optical radiation and convert it into electrical charge. The pixel 200 includes transistors T1-T10. Transistors T1 and T9 are configured to operate as source-followers. Transistors T2 and T8 are configured to respond to a reset signal RST. Transistors T4 and T10 are configured to respond to a select signal SEL. Transistors T3 and T7 are configured to gate a signal from transistors T5 and T6, respectively.

Transistors T5 and T6 are each configured to sense optical radiation in response to demodulation signals PGA and PGB. The effectiveness of conversion of optical radiation to electrical charge, called quantum efficiency, is regulated by the demodulation signals PGA and PGB. For example, when PGA is low, quantum efficiency of T5 becomes lower. Conversely, when PGA is high, quantum efficiency of T5 becomes higher.

Demodulation signals PGA and PGB may have a pulse waveform with about a 50% duty cycle. In an embodiment, a frequency of PGA and PGB may range from about 20 MHz to about 100 MHz; however other frequencies may be used. PGB may be complementary to PGA, such that about half of the time T5 will have a higher quantum efficiency to sense incoming radiation while T6 will senses little or no incoming radiation, and the other half of the time T6 has higher quantum efficiency to sense incoming radiation, while T5 will sense little or no incoming radiation.

T5 and T6 are configured to convert incoming photons into photo-charge. The photo-charge may accumulate at nodes between T5 and T3 and between T6 and T7, respectively. T3 and T7 act as gating devices to allow photo-charge to flow to gate of T1 and T9 respectively during pixel output readout time in response to gating signals TxA and TxB. T1 and T9 are configured to act as source-follower elements to buffer the signal during readout as OutA and OutB. T2 and T8 act as transistors to clear out accumulated photo-charge when a reset signal RST is pulsed. The reset signal RST may be pulsed high for each frame. T4 and T10 activate pixel outputs when the pixel is selected in response to a selection signal SEL. Vaa is pixel power supply.

Figure 3:
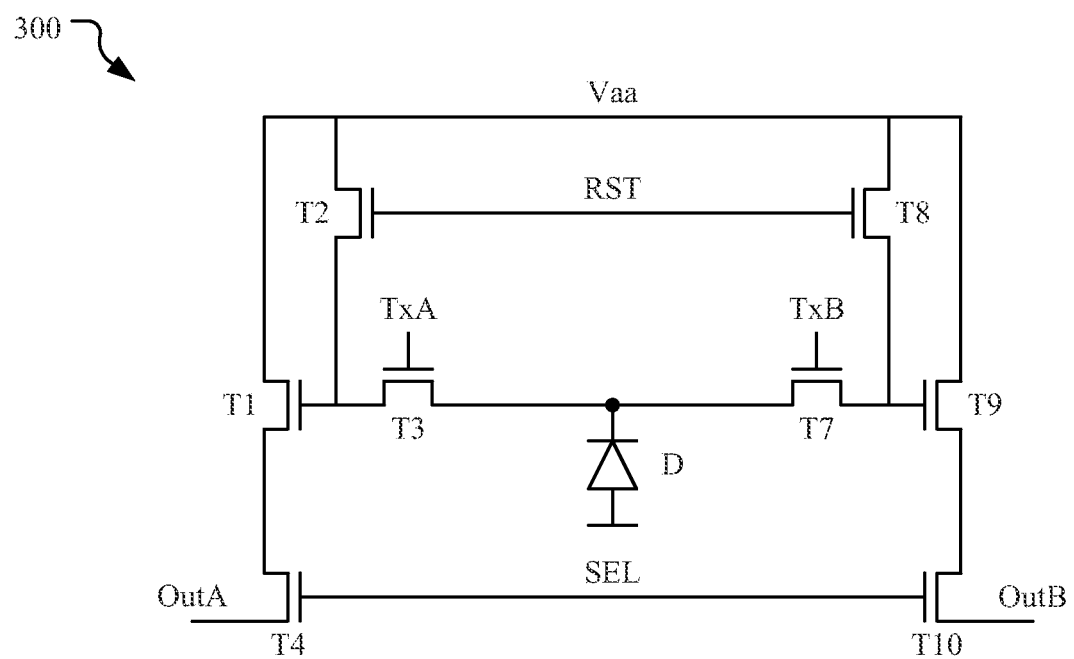
FIG. 3 is a schematic view of a two-tap pixel according to another embodiment.

FIG. 3 is a schematic view of a two-tap pixel according to another embodiment. In this embodiment, the pixel 300 includes a photodiode D, in contrast to the pixel 200. Here, transistors T1, T2, T4 and T8-T10 are configured to operate substantially the same as those of pixel 200 described above. However, the transistors T3 and T7 are configured to both demodulate and gate photo-charge from the photodiode D. In an embodiment, the gating signals TxA and TxB may be used for a function corresponding to the demodulation signals PGA and PGB described above; however, in other embodiments, the gating signals TxA and TxB may be used for other purposes or additional purposes.

Figure 4:
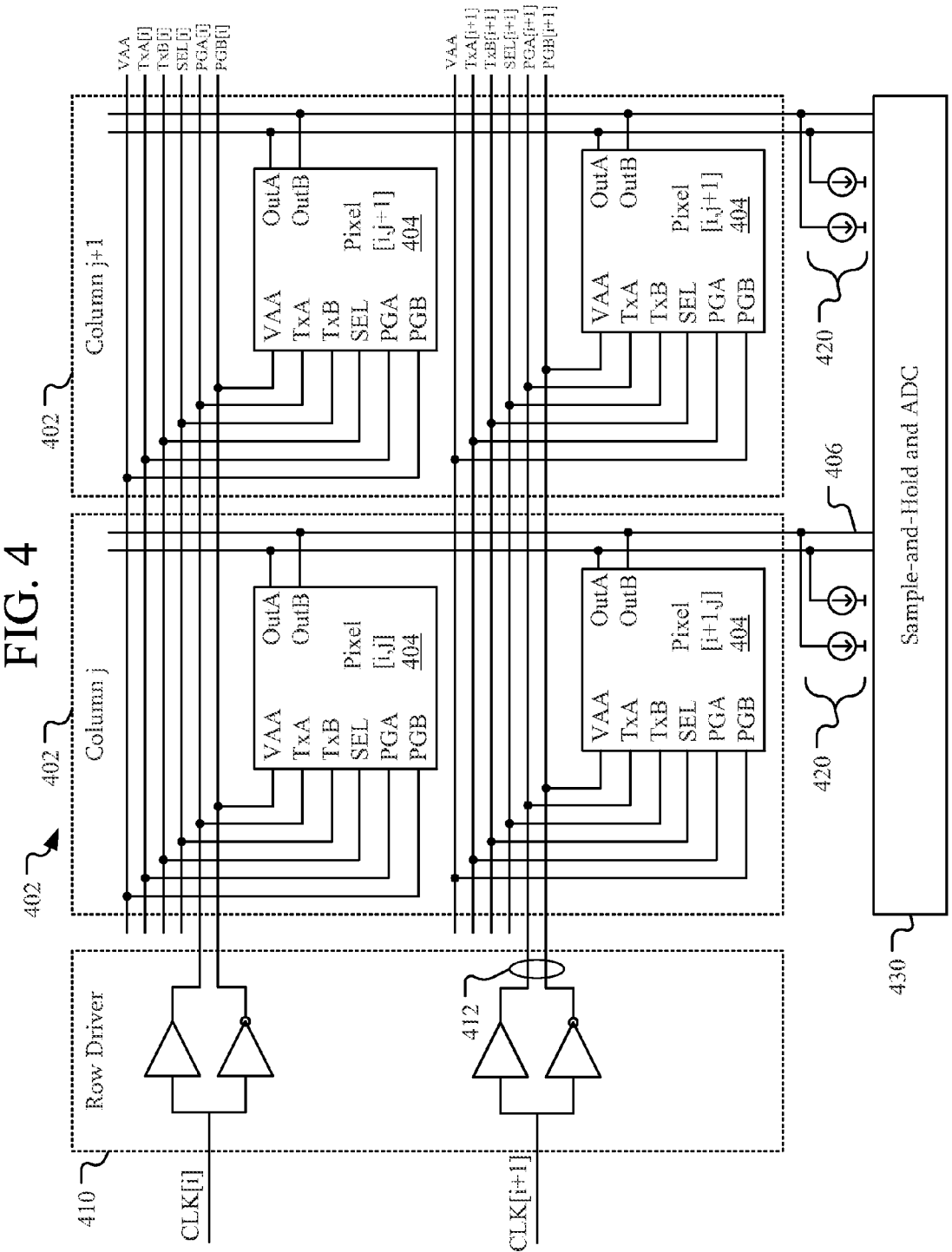
FIG. 4 is a schematic view of a two-tap pixel array according to an embodiment.

FIG. 4 is a schematic view of a two-tap pixel array according to an embodiment. In this embodiment, the pixel array 400 includes multiple pixel columns 402, each including multiple pixels 404. Here, the pixels 404 are similar to the pixel 200 described above and reference will be made to components of pixel 200; however, in other embodiments, other pixel-types may be used. Pixels 404 are labeled as pixel[x,y] where x and y are the row and column numbers, respectively. For example, pixel[i,j] is in the i-th row and the j-th column.

OutA outputs of each pixel 404 in a column 402 are connected to a shared readout line 406. Each readout line 406 includes a current source 420 to form a source follower with T1 in each pixel 404. The output of each readout line 406 may serve as input to an analog-to-digital converter (ADC) 430. Here, the ADC 430 includes a sample-and-hold and an ADC. Similarly to OutA, OutB outputs of each pixel 404 of column 402 are also connected to a shared readout line 406 with its own current source 420. For clarity, only one readout line 406 is labeled.

Pixel inputs TxA, TxB, SEL, PGA and PGB are each connected in row-wise fashion and are configured to be driven by a row driver 410. Demodulation signals PGA and PGB may be generated by buffering each row's demodulation signal clock CLK[i], where PGB is complementary to PGA and generated from an inverting buffer. CLK[i] may or may not differ from CLK[i+1] depending on sensor design architecture such as, for example, the type of shutter used in the pixel array 400. For example, a pixel array 400 configured to operate with a freeze-frame shutter may drive the same clock to all rows simultaneously, i.e. CLK[i]=CLK[i+1]. In another example, a pixel array 400 configured to use a rolling shutter and/or phase matrix array may have CLK[i] and CLK[i+1] operate with different phase shifts, i.e. CLK[i] could operate with a 0 degree shift, while CLK[i+1] operates with a 90 degree shift. Other clock signals (not illustrated) may operate with different phase shifts, such as 180 degree phase shift and 270 degree phase shift.

In an embodiment, two-tap pixels 404 may provide some advantages over single-tap pixels. For example, two-tap pixels 404 may capture depth images faster due to outputting two phase measurements (e.g. 0 and 180 degrees) per each captured raw frame. Single-tap pixels may output only one phase measurement per captured raw frame. Since, in an embodiment, four phase measurements (0, 90, 180 and 270 degrees) are used to calculate distance, a pixel array 400 including single-tap pixels may require capturing a minimum of four raw frames to calculate a depth image, while capturing only two raw frames may be sufficient for a pixel array 400 equipped with two-tap pixels 404.

In another example, two-tap pixels 404 may provide a capability of ambient light cancellation (ALC). ALC functions by removing tap signal contributed by ambient light sources, i.e. those not modulated by imaging system's clock, such as the sun and room illumination such as incandescent lighting. Ambient light sources typically contribute substantially equal exposure to both taps of a two-tap pixel. Since tap photo-charge storage capacity is limited, sources of radiation like sun and room illumination can cause the amount of accumulated photo-charge to reach a tap's capacity. When this happens, the tap becomes over-exposed, meaning that the tap may not be able to sense more signal, the sensitivity changes, or the like. Tap over-exposure may cause an associated calculated distance to become erroneous and in some cases prevent detection of distance. ALC may be used to reduce tap over-exposure caused by ambient light sources by removing the signal contributed by those light sources equally to both taps.

Figure 5:
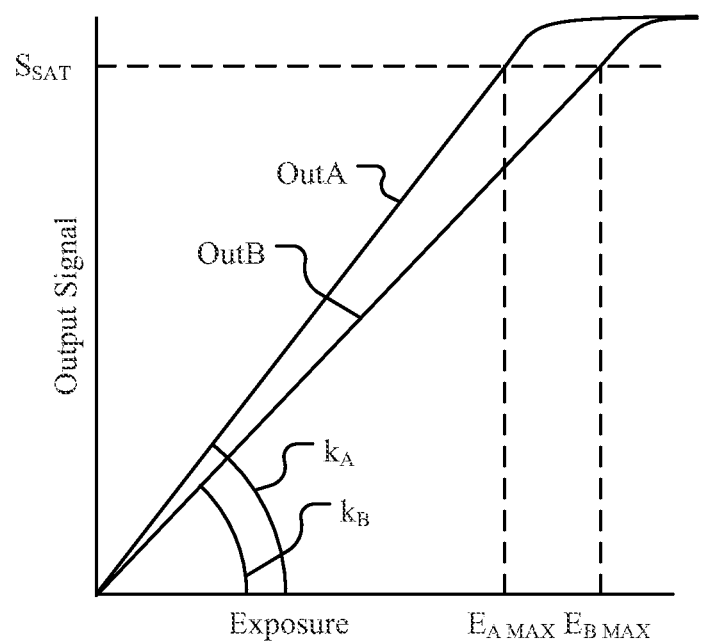
FIG. 5 is a chart of a mismatch in sensitivities of taps of a two-tap pixel.

However, the extent of the above-mentioned advantages may be reduced if tap sensitivities of two-tap pixels 404 differ. FIG. 5 is a chart of a mismatch in sensitivities of output signals from taps OutA and OutB of a two-tap pixel 404. In this embodiment, OutA has a sensitivity $k_A$ and OutB has a sensitivity $k_B$ where $k_A \neq k_B$. As tap OutA is exposed, the output rises according to the sensitivity $k_A$. Here, $k_A > k_B$ thus, OutA will reach the saturation level $S_{SAT}$ before OutB with the same exposure. OutA will reach $S_{SAT}$ at exposure $E_{A\,MAX}$ and OutB will reach $S_{SAT}$ at exposure $E_{B\,MAX}$.

Such unequal sensitivity may reduce the effectiveness of two-tap pixels 404 in generating two phase measurements for depth calculation purposes. Instead, to calculate depth correctly in this situation the two-tap pixel 404 may be used as a pseudo-1 tap pixel. As described above, pseudo-1 tap calculation treats a two-tap pixel as an imaginary single-tap pixel with the single tap value $A_{i,pseudo\ 1\text{-}tap}$ equal to the difference of the two tap signal outputs $(A_i - B_i)$.

When ambient illumination is present, the ambient light may cause tap output signals to increase unequally if the sensitivities are unequal. Sufficiently high ambient light levels may cause one of the taps to over-expose, even while ALC is functioning to continuously remove common offset from both taps.

Figure 6:
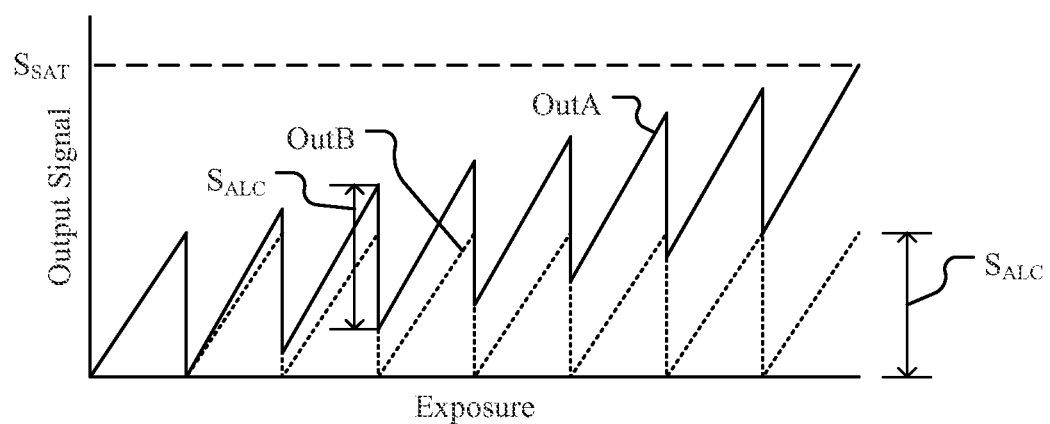
FIG. 6 is chart of output of a two-tap pixel with a mismatch in sensitivities and ambient light cancellation.

FIG. 6 is chart of output of a two-tap pixel with a mismatch in sensitivities and automatic level correction. For illustration purposes, modulated light is absent and only ambient light is present. ALC functions to periodically reduce signal contributed by the sensed ambient light by subtracting equal amounts of signal from both taps OutA and OutB. Here, that amount is $S_{ALC}$. $S_{ALC}$ may be an amount corresponding to a minimum of two outputs. Here that amount is the level of OutB. The amount is periodically removed from bout OutA and OutB at various intervals.

However, since OutA sensitivity is higher than OutB, after subtracting an equal amount of signal $S_{ALC}$, OutB becomes zero, while OutA remains greater than zero and continues to grow with time until it eventually saturates at $S_{SAT}$. As a result, a depth calculation may become erroneous. By substantially equalizing sensitivities of pixels, the effects of potential saturation may be reduced.

Referring back to FIG. 4, in this embodiment, PGA and PGB are shared between pixels 404 in a row, i.e. pixels 404 in the i-th row are responsive to PGA[i] and PGB[i] while pixels 404 in the i+1-th row are responsive to PGA[i+1] and PGB [i+1]. Multiple pixels 404 being connected to shared PGA and PGB lines introduce a distributed capacitive load to the PGA and PGB lines.

As previously described, CLK signals, such as CLK[i] and CLK[i+1], may be implemented as digital signals with relatively fast rise and fall transition times. Keeping rise and fall transition times relatively fast allows a range sensor or other imaging device to reduce noise in distance measurements and thus improve precision. Moreover, demodulation clock rise and fall times may directly affect tap sensitivity. To reduce rising and falling transition times, PGA and PGB are buffered by the row driver 410, where one buffer typically drives one row of pixels.

Parasitic capacitance of pixel 404 photo-gates in each row as well as parasitic capacitance of PGA and PGB routing causes PGA and PGB lines to have a capacitive load. Combined with non-zero resistance of PGA and PGB traces, the PGA and PGB signals effectively propagate through a distributed RC network. As digital signals PGA and PGB propagate over traces with the RC load to pixel PGA and PGB inputs, the signal rise and fall times increase.

Figure 7:
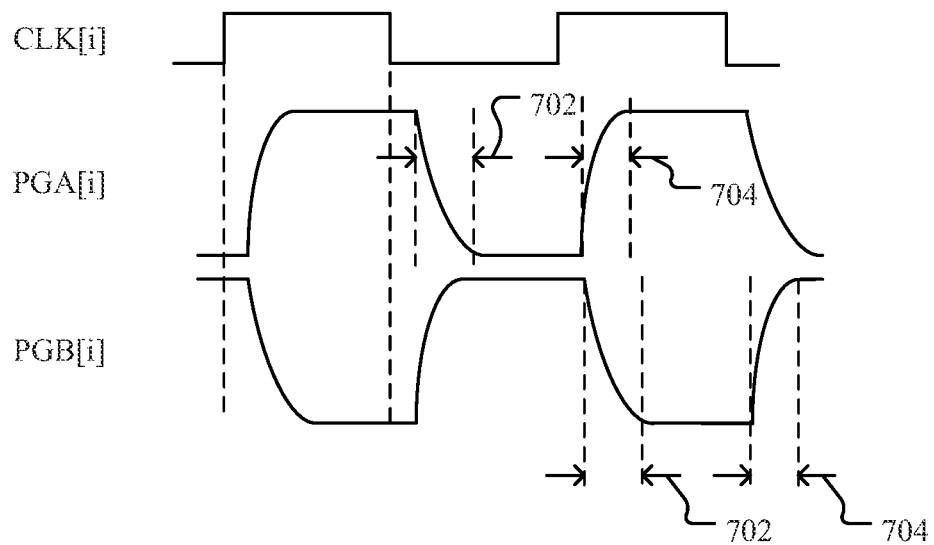
FIG. 7 is a timing diagram of demodulation signals.

FIG. 7 is a timing diagram of demodulation signals. Here CLK[i] is a clock signal for an i-th row. PGA[i] and PGB[i] are the complementary signals generated in response to CLK [i]. Here, PGA[i] and PGB[i] are the state of the signals after the signals have propagated along the PGA/PGB signal lines. PGA[i] and PGB[i] are illustrated as slightly offset from the clock signal CLK[i] and with non-square edges to illustrate the signals at PGA and PGB inputs of a pixel 404, including the effect of the RC network described above between the row driver 410 and the pixel 404. Moreover, due to the RC network the rise and fall times become progressively worse for pixels located further away from the row driver buffer.

Due to various semiconductor manufacturing and circuit design limitations, rise and fall times of PGA[i] and PGB[i] may become unequal. This effect applies to both signals PGA[i] and PGB[i], but not on a complementary basis. That is, in one example, the fall times 702 of both signals PGA[i] and PGB[i] may be increased more than the rise times 704. Thus, not only may the effective duty cycle of each of the signals PGA[i] and PGB[i] change as the signals propagate, i.e. altering clock duty cycle from 50%, but the relationship of the duty cycles of the signals PGA[i] and PGB[i] may diverge. As a result, a mismatch between individual pixels and between taps of individual pixels may become increasingly exacerbated for pixels 404 more distant from a buffer of the row driver 410.

Figure 8:
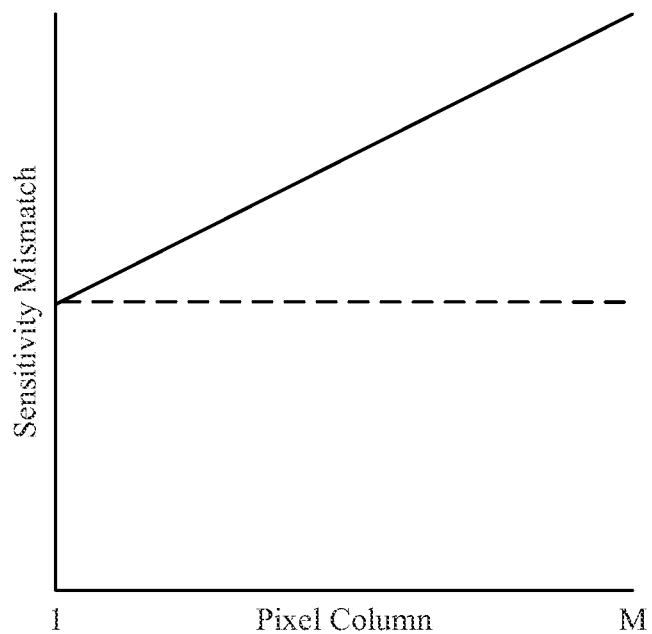
FIG. 8 is a chart of a mismatch between sensitivity of pixel taps.

FIG. 8 is a chart of a mismatch between sensitivity of pixel taps. Here, the sensitivity mismatch is the ratio of the sensitivity of OutA to the sensitivity of OutB of a given pixel 404 in a column. The dashed line is a ratio of one. Assume that the pixel 404 is ideal and tap sensitivity mismatch is caused only by demodulation clock duty cycle differing from 50% due to asymmetric degradation of demodulation clock rise and fall times as it propagates over the RC network as it reaches pixel 404 PGA and PGB inputs in a given column. In this case, PGA and PGB inputs of pixel 404 in the column located closest to the row driver buffers, in column number 1, will receive PGA and PGB signals with 50% duty cycles, while pixels in columns located further away will receive PGA and PGB signals with duty cycles increasingly different from 50%, thus causing a tap sensitivity mismatch to increase as column number increases. Although a tap sensitivity mismatch is illustrated as increasing, in other embodiments, depending on the particular pixels, structures, layouts, or the like, the sensitivity mismatch ratio may decrease.

Figure 9:
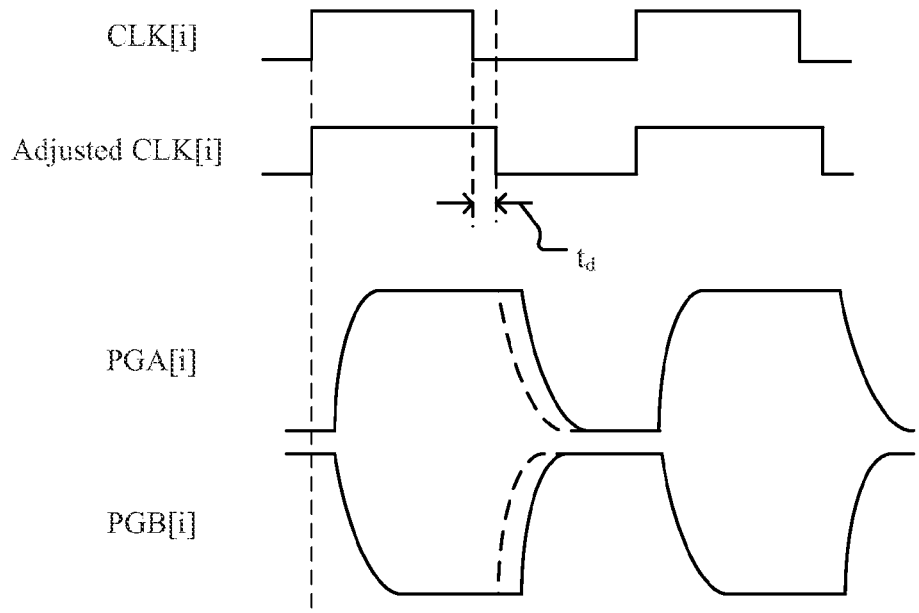
FIG. 9 is a timing diagram of demodulation signals with an adjusted duty cycle according to an embodiment.

FIG. 9 is a timing diagram of demodulation signals with an adjusted duty cycle according to an embodiment. In this embodiment, the duty cycle of CLK[i] is adjusted by, for example, delaying the falling edge by time $t_d$. The adjusted CLK[i] has a duty cycle that is no longer 50%. Accordingly, PGA[i] and PGB[i] have duty cycles that are different from 50% and different from each other. As described above, as the signals PGA[i] and PGB[i] propagate along a row of pixels 404, the duty cycle of the signals PGA[i] and PGB[i] may distort, however, the distortion may change the duty cycle towards 50%. Thus, the sensitivity ratio of OutA and OutB will approach one for pixels 404 further down the PGA/PGB signal lines. Although delaying a particular edge, creating a particular duty cycle for PGA[i] and PGB[i], or the like have been used as examples, the particular edge, change in duty cycle, or the like may be different depending on the particular pixels 404, row driver 410 buffers, or the like.

Figure 10:
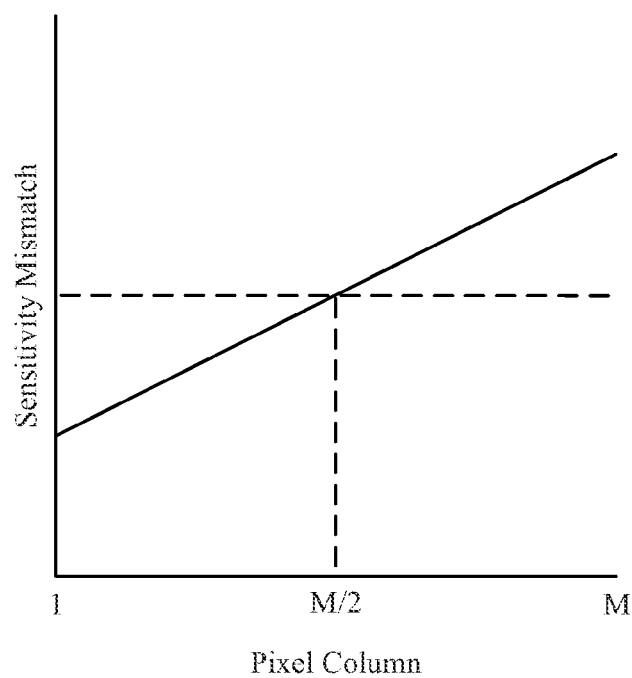
FIG. 10 is a chart of a sensitivity mismatch between pixel taps according to an embodiment.

FIG. 10 is a chart of a sensitivity mismatch between pixel taps according to an embodiment. Similar to FIG. 8, FIG. 10 illustrates a sensitivity mismatch ratio of taps OutA and OutB of a pixel 404 in a column along a row. Again, the horizontal dashed line is a ratio of one. Here, the CLK signal was adjusted as described above. In particular, the CLK signal was adjusted such that at pixel 404 in column M/2 the ratio of the sensitivities of OutA and OutB was about one.

In an embodiment, the OutA outputs and OutB of one or more pixels may be measured in response to the CLK signal. If the process has not been performed, not been performed over a period of time, or the like, the initial duty cycle may be set to about 50%; however, in other embodiments, a stored calibration value, the previous value, or the like may be used as an initial condition.

In a particular example, the one or more pixels may be a single pixel in a center of a row, i.e. a pixel 404 in column M/2. In another example, the one or more pixels may be multiple pixels in the row including the pixel in the center of the row, or one or more pixels in other locations. Moreover, the pixels used may include pixels in other rows. In a particular embodiment, the pixels may include all of the pixels of the pixel array 400.

These measurements may be combined into a combination of the OutA outputs and a combination of the OutB outputs. In response to a combination of the OutA outputs and a combination of OutB outputs, the CLK signal may be adjusted. Note that the combination of the OutA outputs may be a single output OutA in the case of a single pixel and similarly a single OutB as the combination of the OutB outputs.

For example, a direction in change of tap sensitivity when CLK signal duty cycle ratio increases may be determined. This may be used to determine the direction to change the duty cycle. For example, if the sensitivity of OutA increases with increasing duty cycle and if the sensitivity of OutA is lower than the sensitivity of OutB, the duty cycle may be increased until the combinations of the OutA outputs and OutB are substantially similar.

Adjustment of duty cycle may be achieved using various techniques. For example, Xilinx Virtex and Spartan field programmable gate arrays (FPGAs) may provide on-chip digital clock manager functionality including adjustment of clock duty cycle. Other architectural solutions for adjusting clock duty cycle are possible, based on the particular architecture, devices, or the like.

In an embodiment, this process may be repeated. For example, if after adjusting the CLK signal, the sensitivities of the OutA outputs and OutB are not substantially equal, the duty cycle may again be adjusted. Furthermore, if after measurement of the sensitivities of the outputs OutA and OutB, the sensitivities are substantially equal, the adjustment process need not be performed.

In an embodiment, the sensitivities may be checked periodically. For example, the tap sensitivity may change due to environmental or operating conditions, such as power supply changes, temperature changes, or the like. After a fixed period of time, before or after an image is captured, after a change in sensed ambient light, or any variety of other conditions, the process may be repeated to substantially equalize the pixel tap sensitivities.

Figure 11:
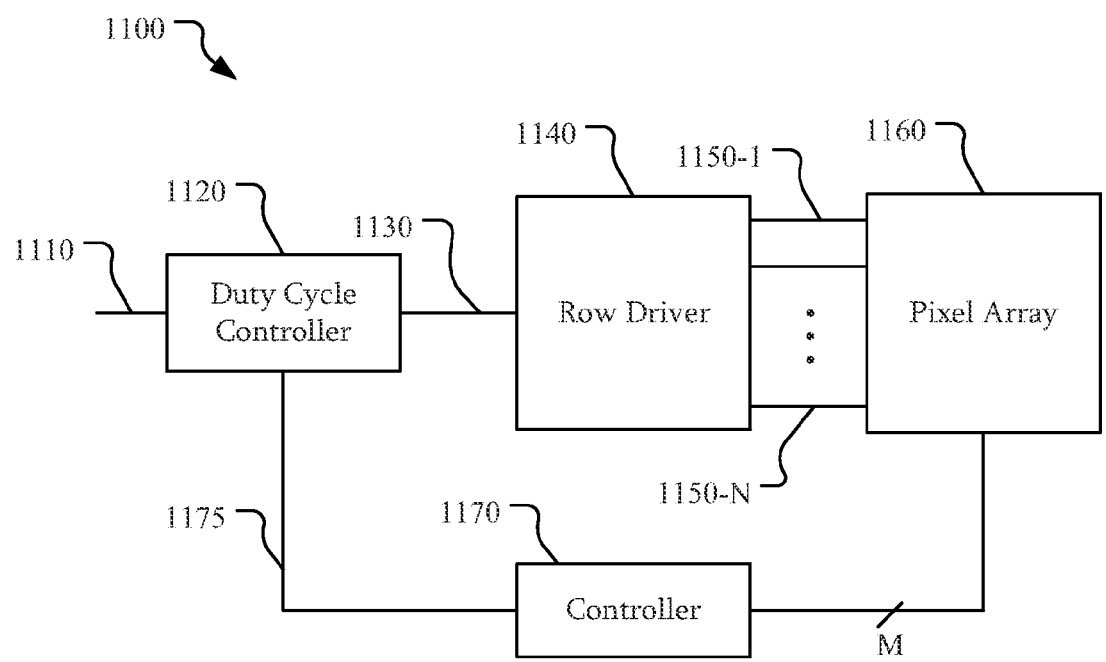
FIG. 11 is a schematic view of an imaging system with a duty cycle adjustment according to an embodiment.

FIG. 11 is a schematic view of an imaging system with a duty cycle adjustment according to an embodiment. In this embodiment, the system 1100 includes a duty cycle controller 1120, a row driver 1140, a pixel array 1160, and a controller 1170. The duty cycle controller 1120 is configured to receive a demodulation signal 1110, such as the CLK signal described above. The duty cycle controller 1120 is configured to adjust the duty cycle of the demodulation signal 1110 to generate an adjusted demodulation signal 1130.

The row driver 1140 is configured to receive the adjusted demodulation signal 1130 and generate the row demodulation signals 1150. Here the row driver 1140 is configured to generate N demodulation signals 1150-1 to 1150-N. In an embodiment, N may be the number of rows of the pixel array 1160; however, in other embodiments, N may be two times the number of rows, such as when a demodulation signal and its complement such as the PGA and PGB signals described above. Although the adjusted demodulation signal 1130 is illustrated as a single input to the row driver 1140, the adjusted demodulation signal 1130 may be divided in to N, N/2, or other discrete adjusted demodulation signals for the row driver 1140.

The controller 1170 is configured to receive signals from the pixel array 1160. For example, here, the pixel array 1160 may have M columns. Accordingly, the controller 1170 may be configured to receive M signals corresponding to the number of columns; however, in other embodiments, different number of signals may be received, such as M*2 signals when each column has a pixel has two taps. In yet other examples, the controller 1170 may be configured to receive only signals from a subset of the columns of the pixel array 1160, such as signals from a column or columns at or near a center of the pixel array 1160.

The controller 1170 is configured to process the signals as described herein. For example, the controller 1170 may be configured to receive M*2 signals from a row in the middle of the pixel array 1160 and process the signals to generate a duty cycle adjustment signal 1175. The duty cycle controller 1120 is configured to adjust a duty cycle of the demodulation signal 1110 in response to the duty cycle adjustment signal 1175.

Figure 12:
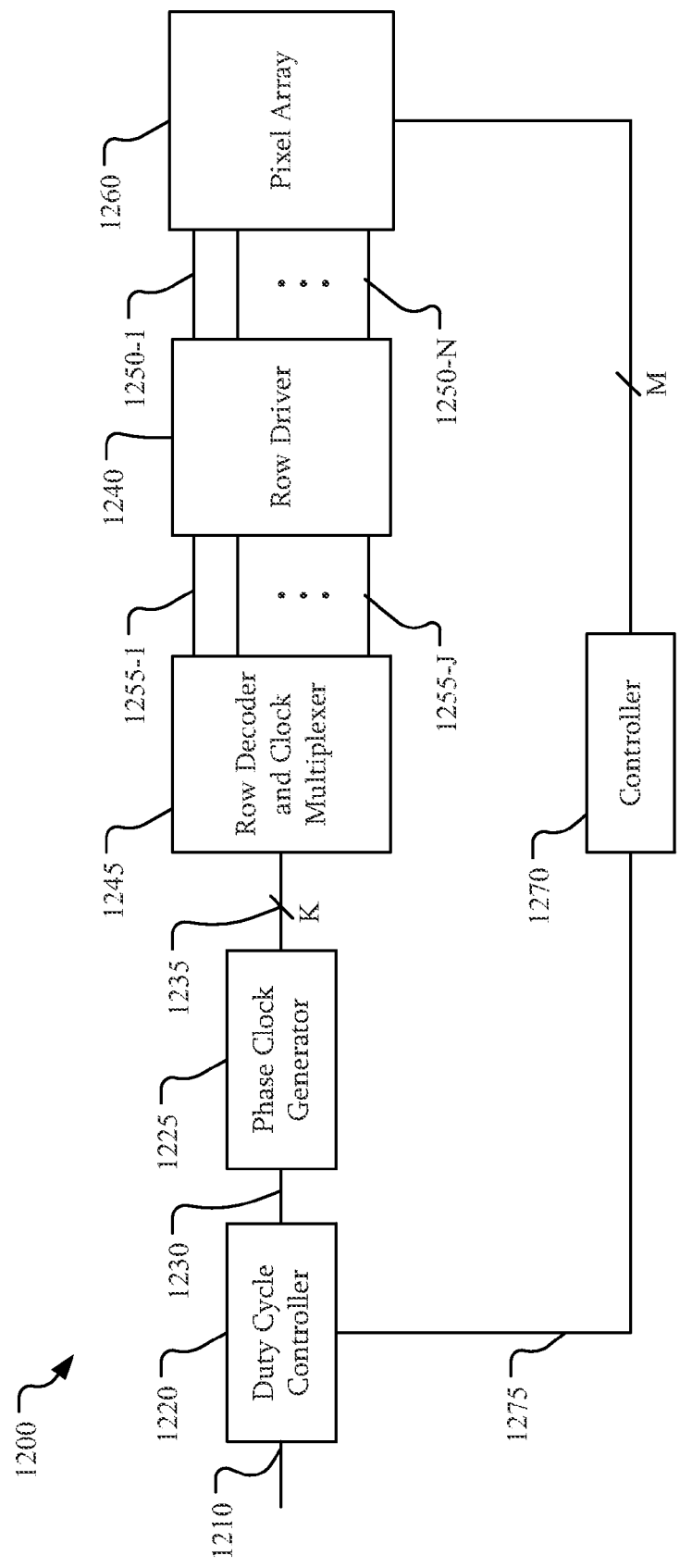
FIG. 12 is a schematic view of an imaging system with a duty cycle adjustment according to another embodiment.

FIG. 12 is a schematic view of an imaging system with a duty cycle adjustment according to another embodiment. In this embodiment, the system 1200 includes a duty cycle controller 1220, a phase clock generator 1225, a row decoder and clock multiplexer 1245, a row driver 1240, a pixel array 1260, and a controller 1270. The duty cycle controller 1220, row driver 1240, pixel array 1260, and controller 1270 may be similar to those described above.

In this embodiment, multiple demodulation signals having different phases may be used with the pixel array 1260. The phase clock generator 1225 is configured to receive the adjusted demodulation signal 1230 and in response, generate K demodulation signals 1235. In a particular example, K may be four, corresponding to four phases of 0, 90, 180, and 270 degrees. In an embodiment, the demodulation signals 1235 have substantially the same duty cycle, i.e. substantially the same as the adjusted demodulation signal 1230.

The row decoder and clock multiplexer 1245 is configured to receive the demodulation signals 1235. Although not illustrated, the row decoder and clock multiplexer 1245 may be configure to respond to other signals, such as a row address, selection signal, enable signal, or the like. The row decoder and clock multiplexer 1245 is configured to generate row demodulation signals 1255. Here, J row demodulation signals 1255 are generated. The row driver 1240 is configured to generate the row demodulation signals 1250 to drive the rows of the pixel array 1260 in response to the row demodulation signals 1255. In an embodiment, the number J of row demodulation signals 1255 may be the same or different from the number N of row demodulation signals 1250. For example, if the pixel array 1260 includes single tap pixels, J and N may be equal. In another example, if the pixel array 1260 includes two-tap pixels, N may be two times J. That is, the row driver 1240 may be configured to generate multiple row demodulation signals 1250 in response to a single row demodulation signal 1255.

In an embodiment, the multiple phases of the demodulation signals 1235 and subsequently generated signals may be used to implement a rolling shutter or phase matrix array with the pixel array 1260. For example, the pixel array 1260 may be concurrently clocked with demodulation signals having 0, 90, 180 and 270 phase shifts. For subsequent frames, the phase of the demodulation signal 1250 for each row may change on a per-frame basis. If the duty cycles of the demodulation signals 1235 are substantially similar, when a different phased demodulation signal 1250 is used, the duty cycle will be substantially similar and consequently, the sensitivity will be substantially similar. That is, the adjustment to the duty cycle may be calculated using only one phase of a demodulation signal and that adjustment may be used for the variety of different phases.

Figure 13:
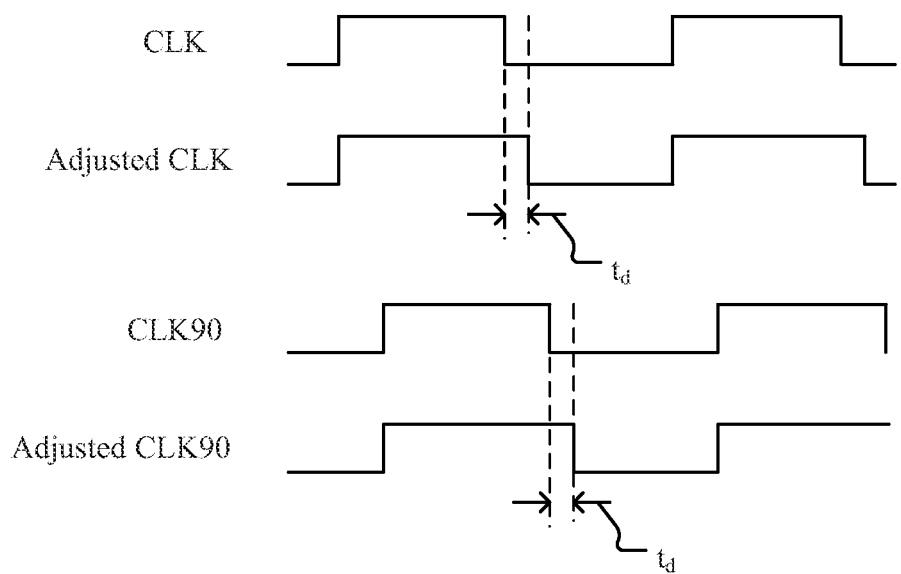
FIG. 13 is a timing diagram of demodulation signals with an adjusted duty cycle according to another embodiment.

FIG. 13 is a timing diagram of demodulation signals with an adjusted duty cycle according to another embodiment. Referring to FIGS. 12 and 13, CLK represents the demodulation signal 1210. The adjusted CLK signal represents the demodulation signal 1230 generated by the duty cycle controller 1220 with the falling edge delayed by $t_d$. The adjusted CLK signal may also represent the 0 degree phase demodulation signal 1235. CLK90 represents a demodulation signal phase shifted by 90 degrees. CLK90 may or may not exist within the phase clock generator 1225. That is, the phase clock generator 1225 may be configured to phase shift the adjusted CLK signal to generate the adjusted CLK90 signal. CLK90 is used to illustrate the delay $t_d$ in the falling edge of the adjusted CLK90 signal with reference to a similarly phased unadjusted demodulation signal CLK90. Although a 90 degree phase shift is used as an example, the other phase shifted demodulation signals 1235 may have duty cycles similarly adjusted. Moreover, the demodulation signals for the other phases are not illustrated for clarity.

Figure 14:
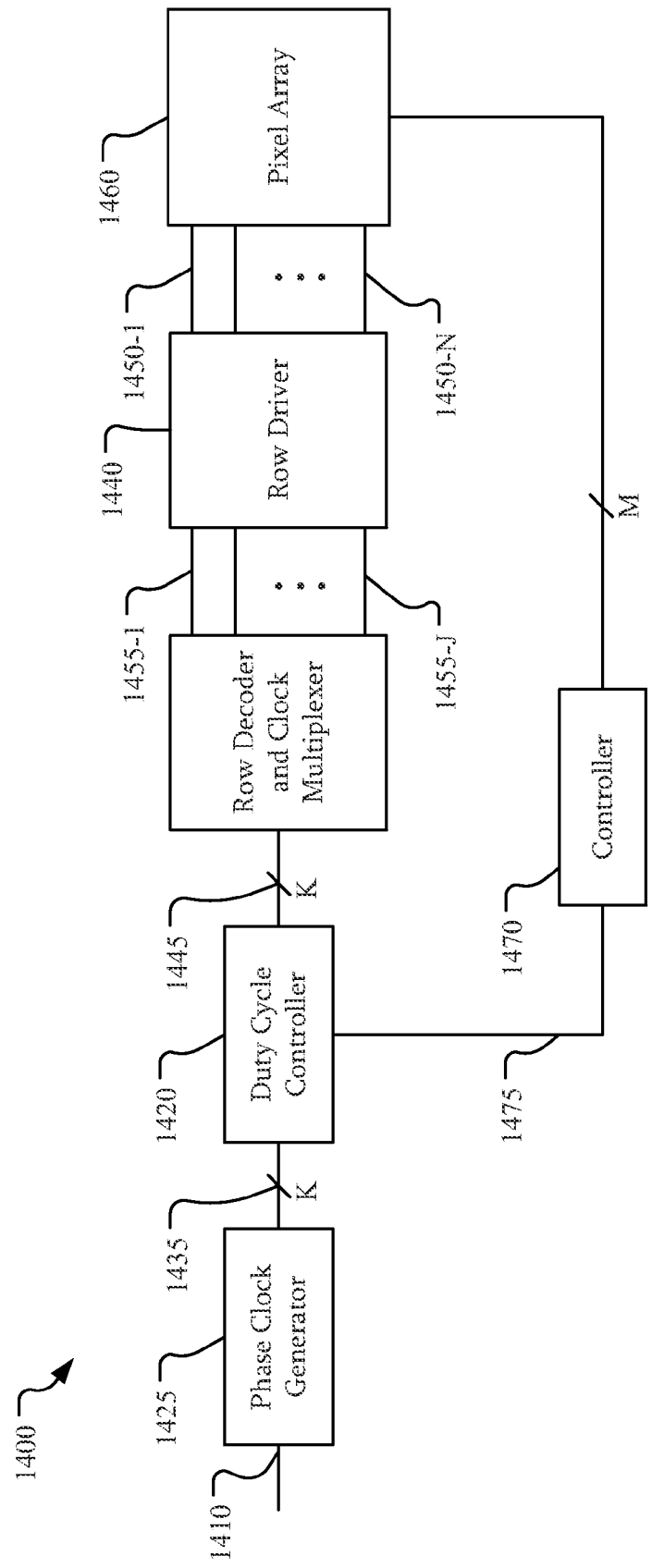
FIG. 14 is a schematic view of an imaging system with a duty cycle adjustment according to another embodiment.

FIG. 14 is a schematic view of an imaging system with a duty cycle adjustment according to another embodiment. In this embodiment, the system 1400 includes a duty cycle controller 1420, a phase clock generator 1425, a row decoder and clock multiplexer 1445, a row driver 1440, a pixel array 1460, and a controller 1470 similar to those described above. However, in this embodiment, the phase clock generator 1425 is configured to receive the demodulation signal 1410. In response the phase clock generator 1425 is configured to generate the phase shifted demodulation signals 1435. However, the duty cycles of these phase shifted demodulation signals 1435 are not adjusted. The duty cycle controller 1420 is configured to receive the phase shifted demodulation signals 1435 and, in response to the adjustment signal 1475, generate adjusted phase shifted demodulation signals 1445. Accordingly, in this embodiment, the K phase shifted demodulation signals 1435 may correspond on a one-to-one basis with the adjusted phase shifted demodulation signals 1445. Although single duty cycle controller 1420 has been used as an example, multiple duty cycle controllers may be used, such as a duty cycle controller for each of the phase shifted demodulation signals 1435.

As described above, a variety of systems may be configured to adjust demodulation signals to adjust sensitivity mismatches of a pixel array. Referring back to FIG. 11, techniques of combining tap signals will be described. In an embodiment, the combined tap signals may be used to estimate, monitor and adjust tap sensitivity by adjusting clock duty cycle, and optionally adjust tap sensitivity digitally. A window of interest R within the pixel array 1160 may be selected. The window of interest R may cover the entire pixel array 1160, as subset of the pixel array 1160, a single pixel, multiple discontinuous regions of the pixel array 1160, or the like. For example, the window of interest R may have a size of N rows by M columns. In a particular example, the widow of interest R may be located substantially at a center of the pixel array 1160, a center of the columns, or the like. During the sampling described herein, the exposure time may be adjusted so that the taps are not over-saturated.

In an embodiment, pixel exposure contributed by the ambient component of scene illumination may drop off away from image center proportional to $\cos^4$ of the angle at which the light is incident on the pixel array. This effect may be referred to as natural vignetting. The pixels located on periphery and having some tap sensitivity mismatch remaining will not receive as much exposure from ambient illumination as those pixels with equalized tap sensitivity located in image center. Therefore, ambient light is less likely to cause over-exposure due to the remaining tap sensitivity mismatch in peripheral pixels. Accordingly, the tap sensitivities may be substantially equalized near a center of the pixel array 1160 to achieve an increased benefit while the diverging sensitivities further away from the center may have a reduced effect on potential errors due to the reducing ambient light component.

Using two-tap pixels with taps A and B as an example, an intensity for tap A, $I_{A,i,j,k}$, and intensity for tap B, $I_{B,i,j,k}$, for each pixel located within the window of interest R is calculated using equations 8 and 9. In equations 8 and 9, index k specifies the frame and indices i and j specify pixel row and column number respectively. $A_{h,k}$ and $B_{h,k}$ are the measurements for the h-th phase for the k-th frame. Here, h ranges from 0 to 3.

$$I_{A,i,j,k} = \frac{\sqrt{(A_{3,k} - A_{1,k})^2 + (A_{2,k} - A_{0,k})^2}}{2} \quad (8)$$

$$I_{B,i,j,k} = \frac{\sqrt{(B_{3,k} - B_{1,k})^2 + (B_{2,k} - B_{0,k})^2}}{2} \quad (9)$$

From the intensity measurements, spatially averaged intensity values within the window of interest R for tap A, $I_{A,k,AVG}$, and tap B, $I_{B,k,AVG}$, are calculated using equations 10 and 11.

$$I_{A,k,AVG} = \frac{\sum_{i,j \in R} I_{A,i,j,k}}{N \cdot M} \quad (10)$$

$$I_{B,k,AVG} = \frac{\sum_{i,j \in R} I_{B,i,j,k}}{N \cdot M} \quad (11)$$

Although using all of the outputs in a window R has been described above, i.e. each output in the N×M region, in other embodiments, less than all of the outputs may be used. For example, the intensity measurement for a given tap, pixel, pixels, or the like may be compared to a threshold. If the output is not above the threshold, the contribution of that value may be discarded. In other words, if an intensity is not above the threshold, that value need not contribute to the combination of the outputs. Similarly, outputs that experience over-exposure may be reduced or excluded from the combinations. Moreover, image exposure time may be adjusted to attempt to avoid over-exposure.

Although averaging has been used as an example to combine the individual pixel outputs together, the combinations may take other forms. For example, outputs from pixels closer to a center of the pixel array 1160 may have higher weights than outputs from pixels further from the center.

In an embodiment, the intensity values may be filtered. For example, filtered tap intensity values $I_{A,FILT}$ and $I_{B,FILT}$ for the window of interest R may be calculated using equations 12 and 13.

$$I_{A,FILT} = \frac{\sum_{s=k-l}^{k} I_{A,s,AVG}}{l+1} \quad (12)$$

$$I_{B,FILT} = \frac{\sum_{s=k-l}^{k} I_{B,s,AVG}}{l+1} \quad (13)$$

In this example, averaging with l previous frames is used. In a particular example, l can be equal to 9; however, in other embodiment l may take other values according to the particular filtering technique, frame rate, or the like. In other embodiments, other filtering techniques may be used. For example, a low-pass sampling filter could be applied to increase stability, accuracy, convergence and absence of oscillation of the tracking procedure. In other embodiments, other types of filters may be used.

The spatially averaged and temporally filtered intensity values $I_{A,FILT}$ for tap A may be compared with the spatially averaged and temporally filtered intensity value and $I_{B,FILT}$ for tap B. If the values are substantially equal, no adjustment of duty cycle is made. If the averaged intensity value for tap A is found to be greater, the duty cycle is adjusted to lower tap A sensitivity or raise tap B sensitivity. Otherwise the duty cycle is adjusted to lower tap B sensitivity or raise tap A sensitivity. As described above, this technique can be performed repeatedly during operation to substantially continuously maintain tap sensitivity equal.

Although spatial and temporal filtering have been used as examples of techniques to combine outputs of the pixels, in other embodiments, the combination may be performed differently. For example, a single pixel may be used to generate the adjustment to the demodulation signals. Accordingly, spatial averaging may be omitted and the temporal filtering may or may not be used. In another example, with multiple pixels, the temporal averaging may be omitted.

As described above, an intensity equivalent AC amplitude of a demodulated signal may be used to generate the duty cycle adjustment. However, in other embodiments, a background offset equivalent to a DC value of a demodulated signal may be used. For example, equations 14-19 describe generating spatially averaged and temporally filtered background signals $F_{A,FILT}$ and $F_{B,FILT}$ similar to the results of equations 12 and 13 described above.

$$F_{A,i,j,k} = \frac{A_{3,k} + A_{2,k} + A_{1,k} + A_{0,k}}{4} - D_{A,i,j} \quad (14)$$

$$F_{B,i,j,k} = \frac{B_{3,k} + B_{2,k} + B_{1,k} + B_{0,k}}{4} - D_{B,i,j} \quad (15)$$

$$F_{A,k,AVG} = \frac{\sum_{i,j \in R} F_{A,i,j,k}}{N \cdot M} \quad (16)$$

$$F_{B,k,AVG} = \frac{\sum_{i,j \in R} F_{B,i,j,k}}{N \cdot M} \quad (17)$$

$$F_{A,FILT} = \frac{\sum_{s=k-l}^{k} F_{A,s,AVG}}{l+1} \quad (18)$$

$$F_{B,FILT} = \frac{\sum_{s=k-l}^{k} F_{B,s,AVG}}{l+1} \quad (19)$$

The combinations of the outputs generating using background signals can be used to adjust the demodulation signals instead of or in addition to combination of the outputs using the intensity signals described above. In an embodiment, the averaged background signal may be corrected for black offset level $D_{A,i,j}$ and $D_{B,i,j}$ for each tap.

Although calculations that include averaging and filtering have been described above with respect to the background-signal-based calculation, variations described above with respect to intensity-based calculations may also be applied to the background-signal-based calculation. Moreover, different variations may be used for background signals in combination with intensity signals in an embodiment. For example, when combining intensity and background based measurements, the background-based measurements may be spatially filtered while the intensity-based measurements may be spatially and temporally filtered.

As described above, even after adjusting the duty cycle of a demodulation signal, a mismatch in sensitivity may still exist for some pixels. For example, tap mismatch may depend on pixel location in the array, such as a particular distance of pixel from row driver buffer. Therefore, even after tap sensitivity is equalized for pixels located, preferably in image center, pixels at other location may still have some tap sensitivity mismatch remaining. As described in further detail below, digital calibration and correction can be applied to substantially equalize the remaining tap sensitivity mismatch. In an embodiment, for each pixel of the pixel array 1160 having tap sensitivities that are not substantially similar after adjusting the demodulation signal, at least one of the first and second outputs the outputs may be scaled such that the scaled first and second outputs are substantially similar.

For example, intensity for tap A, $I_{A,i,j,k}$, and intensity for tap B, $I_{B,i,j,k}$ for each pixel in a window of interest R are calculated as described above in equations 8 and 9. In a particular example, since each pixel may be corrected, the window of interest R for these calculations may include the entire pixel array. The entire pixel array will be used as an example.

In equations 20 and 21, temporally averaged tap intensity values $I_{A,i,j,AVG}$ and $I_{B,i,j,AVG}$ for each pixel in the entire image are calculated. Here, the tap intensity values are averaged across q previous frames; however, in other embodiments, other filtering techniques, including techniques different from a particular technique used when adjusting the duty cycle as described above.

$$I_{A,i,j,AVG} = \frac{\sum_{s=k-q}^{k} I_{A,i,j,s}}{q+1} \quad (20)$$

$$I_{B,i,j,AVG} = \frac{\sum_{s=k-q}^{k} I_{B,i,j,s}}{q+1} \quad (21)$$

A B tap sensitivity correction coefficient for each pixel in the entire image is calculated using equation 22.

$$k_{B,i,j} = \frac{I_{A,i,j,AVG}}{I_{B,i,j,AVG}} \quad (22)$$

The B tap sensitivity correction coefficient is applied to B tap samples as in equation 23. Here, p designates tap phase, such as 0, 1, 2, and 3 as described above, corresponding to 0, 90, 180, and 270 degrees. The corrected B tap values may subsequently be used in image distance, intensity background equations, or the like.

$$B_{p,i,j,k,CORR} = B_{p,i,j,k} k_{B,i,j} \quad (23)$$

Although correcting tap B has been used as an example, the equations may be changed to correct tap A, correct both tap A and tap B, or the like. Moreover, this technique may be performed repeatedly, regardless of whether it is performed synchronized with the demodulation signal adjustment described above.

In an embodiment, the tap sensitivity correction may be deferred for pixels experiencing over-exposure. For example, if taps in a pixel are overexposed, the calculation of the correction coefficient for that pixel may be delayed until tap overexposure condition disappears, for example due to changes in the scene, scene illumination, camera exposure, camera light source power, or the like. Alternatively or in addition, these calculations may be used for only those pixels that have intensity signal measurements greater than a threshold. For example, if pixel intensity is too low, the calculation of the correction coefficient for that pixel may be delayed until the tap underexposure condition disappears, for example due to changes in the scene, scene illumination, camera exposure, camera light source power, or the like.

In another embodiment, temporally filtered background signals $F_{A,i,j,AVG}$ and $F_{B,i,j,AVG}$ can be used in the compensation coefficient calculation procedure instead of or in addition to the averaged intensity signal as described in equations 24-26. If necessary, the averaged background signal should be corrected for black offset level $D_{A,i,j}$ and $D_{B,i,j}$ for each tap as described above.

$$F_{A,i,j,AVG} = \frac{\sum_{s=k-q}^{k} F_{A,i,j,s}}{q+1} \quad (24)$$

$$F_{B,i,j,AVG} = \frac{\sum_{s=k-q}^{k} F_{B,i,j,s}}{q+1} \quad (25)$$

$$k_{B,i,j} = \frac{F_{A,i,j,AVG}}{F_{B,i,j,AVG}} \quad (26)$$

Although the various techniques described above have been described in the context of two-tap pixels, these techniques may also be used with pixels having more than two taps. Moreover, a similar technique may be used with single-tap pixels. For example, referring to FIG. 8, the sensitivity mismatch may be a ratio between a sensitivity of the pixel in column 1 and sensitivities in other pixels. The intensity of the pixels in a region may be calculated similar to those described in equation 8. The spatial averaging described in equations 10 and 11 need not be performed, may be performed on a smaller region of pixels, or the like. The results may be filtered across frames as described in equation 12.

Using the results, the duty cycle may be adjusted to achieve a result similar to FIG. 10. For example, the duty cycle may be adjusted such that a ratio of a pixel sensitivity after adjustment to the pixel in column 1 before adjustment is substantially one at about a pixel in column M/2. Although the use of intensity has been used as an example here, in other embodiments, a background signal may be used, similar to those described above. Furthermore, after an adjustment of the demodulation signal, the individual pixels may be mathematically corrected by calculating a correction similar to the correction described in equations 20-23.

Figure 15:
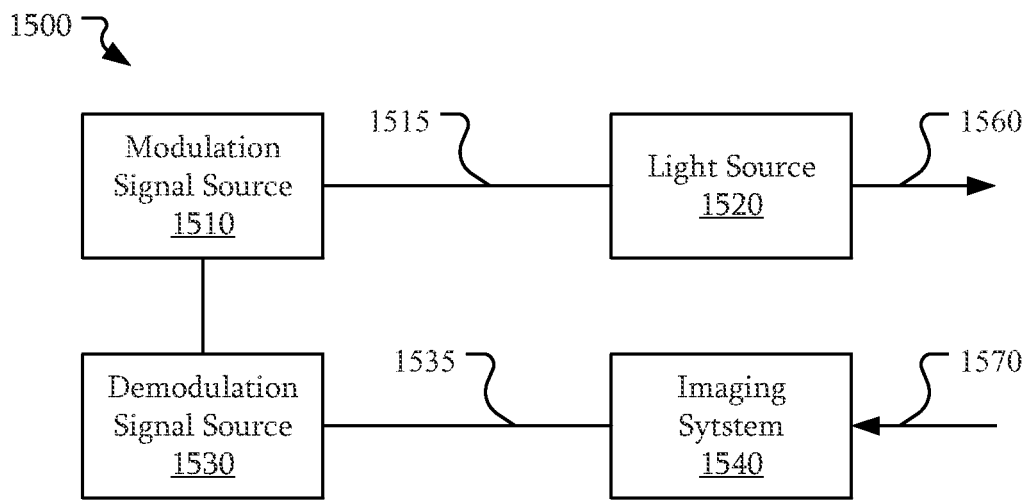
FIG. 15 is a schematic view of an imaging system according to an embodiment.

FIG. 15 is a schematic view of an imaging system according to an embodiment. In this embodiment, the system 1500 includes a modulation signal source 1510, a light source 1520, a demodulation signal generator 1530 and an imaging system 1540. The modulation signal source 1510 is configured to generate a modulation signal 1515. The light source 1520 is configured to generate a modulated light signal 1560 in response to the modulation signal 1515. In a particular embodiment, the light source 1520 may be configured to generate a modulated infrared signal as the modulated light signals 1560. Regardless of the type of modulated light signal 1560, the imaging system 1540 is configured to sense that type of light.

The demodulation signal generator 1530 is coupled to the modulation signal source 1510. Accordingly, the demodulation signal generator 1530 may be configured to generate a demodulation signal 1535 that is synchronized with the modulation signal 1515. The demodulation signal 1535 may be the demodulation signals described above. The imaging system 1540 may include an imaging system described above.

Although the demodulation signal 1535 has been described as being synchronized with the modulation signal 1515, in some embodiments, the demodulation signal 1535 used with the imaging system 1540 need not be synchronized with the modulation signal 1515. For example, if the equalization described above is performed using background signal measurements, a different modulation signal 1515 may be used.

Figure 16:
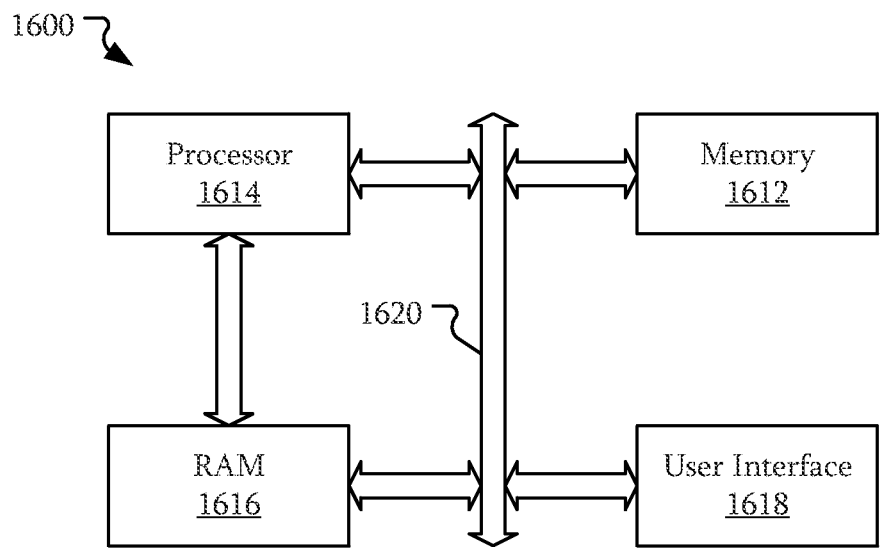
FIG. 16 is a schematic view of an electronic system which may include an imaging system according to an embodiment.

FIG. 16 is a schematic view of an electronic system which may include an imaging system according to an embodiment. The electronic system 1600 may be part of a wide variety of electronic devices including, but not limited to, measurement devices, depth imaging devices, time-of-flight imaging devices, portable notebook computers, Ultra-Mobile PCs (UMPC), Tablet PCs, servers, workstations, mobile telecommunication devices, and so on. Any device that may include an imaging device may include the electronic system 1600. For example, the electronic system 1600 may include a memory system 1612, a processor 1614, RAM 1616, and a user interface 1618, which may execute data communication using a bus 1620.

The processor 1614 may be a microprocessor or a mobile processor (AP). The processor 1614 may have a processor core (not illustrated) that can include a floating point unit (FPU), an arithmetic logic unit (ALU), a graphics processing unit (GPU), and a digital signal processing core (DSP Core), or any combinations thereof. The processor 1614 may execute the program and control the electronic system 1600. The processor 1614 may be configured to perform some or all of the operations of the various controllers described above.

The RAM 1616 may be used as an operation memory of the processor 1614. Alternatively, the processor 1614 and the RAM 1616 may be packaged in a single package body.

The user interface 1618 may be used in inputting/outputting data to/from the electronic system 1600. For example, the user interface 1618 may include the imaging system, or the like as described above. Such an imaging system may be part of a camera that is included in the user interface 1618. The user interface 1618 may also include the light source as described above. Moreover, the user interface 1618 may include controls to actuate a measurement system, image capture system, or the like.

The memory system 1612 may store codes for operating the processor 1614, data processed by the processor 1614, or externally input data. The memory system 1612 may include a controller and a memory. The memory system may include an interface to computer readable media. Such computer readable media may store instructions to perform the variety of operations describe above.

Although the structures, methods, and systems have been described in accordance with exemplary embodiments, one of ordinary skill in the art will readily recognize that many variations to the disclosed embodiments are possible, and any variations should therefore be considered to be within the spirit and scope of the apparatus, method, and system disclosed herein. Accordingly, many modifications may be made by one of ordinary skill in the art without departing from the spirit and scope of the appended claims.

The invention claimed is:

1. A method, comprising:
for a plurality of pixels having a first output and a second output, measuring the first outputs and the second outputs in response to a demodulation signal; and adjusting the demodulation signal such that a combination of the first outputs is substantially similar to a combination of the second outputs.

2. The method of claim 1, wherein adjusting the demodulation signal comprises adjusting a duty cycle of the demodulation signal.

3. The method of claim 1, wherein measuring the first outputs and the second outputs comprises measuring the first outputs and the second outputs over a time less than an over-exposure time of any of the first and second outputs.

4. The method of claim 1, further comprising for each pixel, including the first output in the combination of the first outputs only if the first output indicates an intensity above a threshold.

5. The method of claim 1, wherein measuring the first outputs and the second outputs comprises performing an ambient intensity measurement for the first and second outputs.

6. The method of claim 1, the plurality of pixels referred to as a first plurality of pixels, wherein:
the second plurality of pixels include the first plurality of pixels and a third plurality of pixels; and
the third plurality of pixels are not responsive to the demodulation signal.

7. The method of claim 1, further comprising:
for each pixel of the plurality of pixels having first and second outputs that are not substantially similar after adjusting the demodulation signal, scaling at least one of the first and second outputs such that the scaled first and second outputs are substantially similar.

8. The method of claim 1, wherein the plurality of the pixels are substantially in a center of a pixel array.

9. The method of claim 1, wherein measuring the first outputs and the second outputs comprises measuring the first outputs and the second outputs over a plurality of frames.

10. The method of claim 1, wherein the plurality of the pixels includes pixels in multiple rows and multiple columns.

11. A system, comprising:
a demodulation signal generator configured to generate a demodulation signal;
a pixel array coupled to the demodulation signal generator and including a plurality of pixels, each pixel configured to generate a first output and a second output in response to the demodulation signal; and
a controller configured to:
measure the first outputs and the second outputs; and
adjust the demodulation signal such that a combination of the first outputs is substantially similar to a combination of the second outputs.

12. The system of claim 11, wherein the controller is configured to adjust a duty cycle of the demodulation signal.

13. The system of claim 11, wherein the controller is configured to measure the first outputs and the second outputs over a time less than an over-exposure time of any of the first and second outputs.

14. The system of claim 11, wherein the controller is configured to, for each pixel, include the first output in the combination of the first outputs only if the first output indicates an intensity above a threshold.

15. The system of claim 11, wherein the controller is configured to perform an ambient intensity measurement for the first and second outputs.

16. The system of claim 11, the plurality of pixels referred to as a first plurality of pixels, wherein:
the pixel array includes a second plurality of pixels;
the second plurality of pixels include the first plurality of pixels and a third plurality of pixels; and
the third plurality of pixels are not responsive to the demodulation signal.

17. The system of claim 11, wherein the controller is configured to, for each pixel of the plurality of pixels having first and second outputs that are not substantially similar after adjusting the demodulation signal, scale at least one of the first and second outputs such that the scaled first and second outputs are substantially similar.

18. The system of claim 11, further comprising:
a user interface; and
a camera including the pixel array;
wherein the system is included in a mobile device.

* * * * *